United States Patent
Kanzelberger-Coolich et al.

(10) Patent No.: US 10,709,154 B2
(45) Date of Patent: Jul. 14, 2020

(54) WEATHERIZED MINERALS AND METHODS OF MAKING AND USING SAME

(71) Applicant: PURINA ANIMAL NUTRITION LLC, Shoreview, MN (US)

(72) Inventors: Melissa Kanzelberger-Coolich, Hillsboro, MO (US); Ronald R. Scott, St. Charles, MO (US)

(73) Assignee: PURINA ANIMAL NUTRITION LLC, Arden Hills, MN (US)

(*) Notice: Subject to any disclaimer, the term of this patent is extended or adjusted under 35 U.S.C. 154(b) by 607 days.

(21) Appl. No.: 15/337,849

(22) Filed: Oct. 28, 2016

(65) Prior Publication Data

US 2017/0042190 A1 Feb. 16, 2017

Related U.S. Application Data

(63) Continuation of application No. 13/765,298, filed on Feb. 12, 2013, now Pat. No. 9,504,269.

(60) Provisional application No. 61/598,505, filed on Feb. 14, 2012.

(51) Int. Cl.
| | |
|---|---|
| *A23K 20/20* | (2016.01) |
| *A23K 40/20* | (2016.01) |
| *A23K 40/25* | (2016.01) |
| *A23K 20/158* | (2016.01) |
| *A23K 50/10* | (2016.01) |
| *A23K 40/30* | (2016.01) |

(52) U.S. Cl.
CPC ............ *A23K 20/20* (2016.05); *A23K 20/158* (2016.05); *A23K 40/20* (2016.05); *A23K 40/25* (2016.05); *A23K 40/30* (2016.05); *A23K 50/10* (2016.05)

(58) Field of Classification Search
CPC ...... A23K 20/20; A23K 20/158; A23K 40/20; A23K 40/25; A23K 40/30; A23K 50/10
See application file for complete search history.

(56) References Cited

U.S. PATENT DOCUMENTS

| | | | |
|---|---|---|---|
| 2,861,024 A | 11/1958 | Silver | |
| 3,198,635 A | 8/1965 | Anderson | |
| 3,467,525 A * | 9/1969 | Flier ...................... | A23K 40/20 426/293 |
| 3,476,565 A | 11/1969 | Anderson et al. | |
| 3,692,529 A * | 9/1972 | Rychnnan ................ | B01J 2/006 252/1 |
| 3,892,880 A | 7/1975 | Grolitsch | |
| 3,926,841 A | 12/1975 | Habasko | |
| 4,171,385 A | 10/1979 | Hodge et al. | |
| 4,171,386 A | 10/1979 | Dickerson et al. | |
| 4,265,916 A | 5/1981 | Skoch et al. | |
| 5,068,114 A | 11/1991 | Chanen et al. | |
| 5,225,238 A | 7/1993 | Ardaillon et al. | |
| 5,230,913 A * | 7/1993 | Klemann ............... | A23D 9/007 426/531 |
| 5,296,219 A | 3/1994 | Ardaillon et al. | |
| 5,662,958 A | 9/1997 | Kennelly et al. | |
| 5,935,626 A | 8/1999 | Moechnig et al. | |
| 5,997,939 A | 12/1999 | Moechnig et al. | |
| 8,163,059 B2 | 4/2012 | Tran | |
| 2004/0234650 A1* | 11/2004 | Mishra ................... | A23K 40/30 426/74 |
| 2006/0067984 A1* | 3/2006 | Cavassini ............ | A61K 9/1611 424/438 |
| 2006/0073193 A1* | 4/2006 | Marcussen ............ | A23K 40/10 424/442 |
| 2006/0127531 A1 | 6/2006 | Jobe | |
| 2006/0127536 A1* | 6/2006 | Fallin ..................... | A23K 40/35 426/99 |
| 2006/0263496 A1 | 11/2006 | Cross et al. | |
| 2008/0113064 A1 | 5/2008 | Bevans et al. | |
| 2008/0152755 A1 | 6/2008 | Lebo et al. | |
| 2009/0162455 A1* | 6/2009 | Koppe ................... | A61K 31/05 424/747 |
| 2013/0115297 A1* | 5/2013 | Becker ..................... | A61K 9/16 424/493 |

FOREIGN PATENT DOCUMENTS

| | | | |
|---|---|---|---|
| EP | 0125894 A2 | 11/1984 | |
| EP | 0293070 A1 | 11/1988 | |
| EP | 0363733 | 4/1990 | |
| GB | 335175 A * | 9/1930 | ............... B01J 2/30 |
| GB | 1492060 | 11/1977 | |
| GB | 2241862 | 9/1991 | |
| GB | 2383737 | 7/2003 | |
| GB | 2383738 | 7/2003 | |
| GB | 2446140 | 8/2008 | |
| WO | WO 2003056934 | 7/2003 | |
| WO | WO 2004082398 | 9/2004 | |
| WO | 2006034098 A1 | 3/2006 | |
| WO | WO 2006082824 | 8/2006 | |
| WO | WO 2006108280 | 10/2006 | |
| WO | WO 2007093876 | 8/2007 | |
| WO | WO 2007100251 | 9/2007 | |
| WO | WO 2007118614 | 10/2007 | |
| WO | WO 2009024475 | 2/2009 | |
| WO | WO 2010066397 | 6/2010 | |
| WO | WO 2011114151 | 9/2011 | |
| WO | 2013122942 A1 | 8/2013 | |

\* cited by examiner

*Primary Examiner* — C. Sayala

(74) *Attorney, Agent, or Firm* — Dorsey & Whitney LLP

(57) ABSTRACT

A weatherized mineral mixture is produced by heating a digestible fat or fatty acid and spraying a mineral mixture with the heated digestible fatty acid to form a protective layer over the mineral mixture. The weatherized mineral mixture may be free of salts of fatty acids, namely soaps. The weatherized mineral mixture sheds water and is wind-resistant. Upon ingestion by livestock animals, the protective coating is digested and the minerals within the mineral mixture are absorbed by the livestock animal.

14 Claims, 1 Drawing Sheet

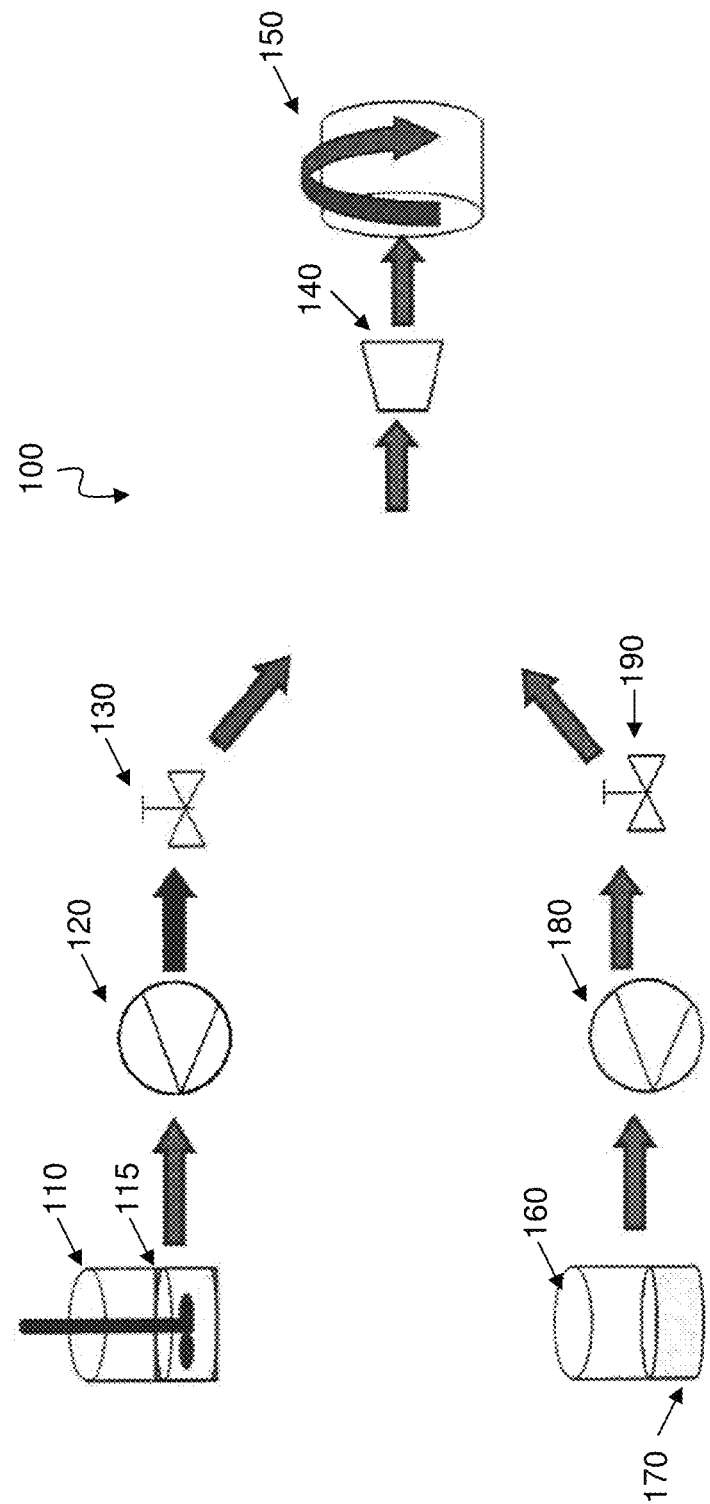

WEATHERIZED MINERALS AND METHODS OF MAKING AND USING SAME

CROSS-REFERENCE TO RELATED APPLICATIONS

This application is a continuation of U.S. patent application Ser. No. 13/765,298 filed Feb. 12, 2013 now U.S. Pat. No. 9,504,269 which claims benefit to U.S. Provisional Application No. 61/598,505 filed Feb. 14, 2012, the contents of all are incorporated by reference in their entireties.

FIELD OF THE INVENTION

Implementations provide weatherized minerals with a digestible protective coating and methods of making and using the weatherized minerals in free-choice mineral applications.

BACKGROUND

Free-choice minerals are generally loose minerals placed in an open container in pasture. Livestock animals, such as beef and dairy cattle, consume the free-choice minerals intermittently while grazing in pasture. When the free-choice minerals are exposed to environmental factors such as wind and rain, loss may occur. Wind may blow away the minerals or rain may cause trace minerals to leech from the mineral mixture. In some cases, when the minerals are exposed to rain, the minerals become wet and may cake-up preventing flow.

Free-choice minerals may be protected from wind and rain by forming a first protective soap coating over cores and a second protective coating over the soap coating. The soap is generally formed by adding a metal oxide to the minerals and then reacting the metal oxide with a fatty acid. This process of forming soap may be problematic because reacting the metal oxide provided on or in the minerals with the fatty acid or petrolatum may result in inconsistent or incomplete hydrolysis, which may result in the coated particles sticking or caking. The second protective coating, such as petrolatum, is applied over the soap coating. However, prior to applying the protective coating, the soap-coated particles generally require dusting to prevent caking or sticking of the otherwise sticky, non-flowing soap-coated particles.

Coating minerals with multiple protective layers as provided above can be problematic because the minerals may remain protected within the digestive system of the livestock animal and may not be digested or absorbed. In addition, petrolatum is a non-digestible substance and provides no benefit to the animal. Observing a livestock animal ingesting these protected minerals may also be misleading for a farmer or a nutritionist that believes the livestock animal is benefiting from ingesting the protected free-choice minerals, when the livestock animal is not actually receiving the intended benefits.

SUMMARY

Implementations herein address the problems above by providing weatherized or weather-protected mineral mixture products that include a protective layer of fat, such as a digestible fat, as well as methods of making and using the weatherized mineral mixture products.

In certain implementations, a method of forming a weatherized mineral mixture free of salts of fatty acids, e.g., soap, includes heating a fat and spraying a mineral mixture with the heated fat to form a protective layer over the mineral mixture.

In another implementation, a method of forming a weatherized mineral mixture involves spraying a flowable digestible fat over a mineral mixture to form a protective layer over a first portion of the mineral mixture. A second portion of the mineral mixture is substantially free of the protective layer. The method continues by spraying an oil over the mineral mixture portions to incorporate the second portion onto the protective layer overlying the first portion.

In yet another implementation, a weatherized mineral mixture includes a mineral mixture with a protective layer formed over the mineral mixture that is composed of a fat and is free of salts of fatty acids.

In further implementations, a method of providing livestock animals with free-choice minerals includes providing the livestock animals with a weatherized mineral mixture formed of a mineral mixture coated with a fat, where the weatherized mineral mixture is free of salts of fatty acids and where minerals in the mineral mixture are absorbed by the digestive system of the livestock animal.

In still further implementations, a method of forming a weather-resistant, anti-caking mineral mixture involves heating a digestible fat to form a flowable, digestible fat; and spraying a mineral mixture with the flowable, digestible fat to provide a protective layer over the mineral mixture to form the weather-resistant, anti-caking mineral mixture, where the weather-resistant, anti-caking mineral mixture is free of salts of fatty acids.

In yet further implementations, a method of forming a weather-resistant, anti-caking mineral mixture involves spraying a flowable digestible fat over at least a first portion of a mineral mixture to form a protective layer over the first portion; providing a second portion of the mineral mixture that is substantially free of the protective layer; and spraying an oil over the first and second mineral mixture portions to incorporate the second portion onto the protective layer overlying the first portion to provide the weather-resistant, anti-caking mineral mixture, where the weather-resistant, anti-caking mineral mixture is free of salts of fatty acids.

In some implementations, a weather-resistant, anti-caking mineral mixture includes mineral mixture particles with a protective layer in which the protective layer comprises a fat, and where the weather-resistant, anti-caking mineral mixture is free of salts of fatty acids.

DESCRIPTION OF THE DRAWING

FIG. 1 illustrates a flow diagram of a production system for forming weatherized minerals, according to certain implementations.

DETAILED DESCRIPTION

Weatherized minerals provided herein include a protective coating of fat surrounding mineral particles. The weatherized minerals may be formed by spraying digestible fats over mineral and nutrient particles. The protected minerals and nutrients may be weather-resistant, flowable and may have a shiny or wet appearance. In some implementations, a flowable oil coating such as mineral oil may coat the exterior of the fat-coated protected mineral particles. Livestock animals in pasture may ingest the protected minerals and the subsequent digestion or absorption of the fats and mineral particles may provide dietary benefits to the livestock animal that may otherwise not be realized using other forms of protected minerals with coatings of non-digestible material. Accordingly, the digestible fat not only protects the minerals and nutrients from environmental factors such as wind, rain and snow, but also provides an energy source, unlike other forms of protected minerals that use non-digestible petrolatum.

Fats used to coat the minerals and nutrients may be in the form of high melting point fats that are substantially solid at room temperature. High melting point fats may include palm stearin, palm fat, palm stearin, coconut oil, lauric acid, palmitic acid, palmitoleic acid, animal fats such as beef tallow and pork fat and combinations thereof. The high melting point fats may be digestible and may be known a free fatty acids or triglyceride fatty acids. High melting point fats may provide advantages over fats that are liquid at ambient temperatures due to the fat with a low melting point having a propensity to go rancid in the presence of minerals. Fats such as palm fat may be composed of at least 98 percent fat, and may include combinations of one or more of palmitic acid, stearic acid and oleic acid. For example, the digestible fat may include palmitic acid between about 40 to 75 percent; between about 40 and 55 percent; between about 55 to 70 percent with the balance including one or a combination of stearic and oleic acid. In some implementations, other fats such as unsaturated fats may be provided in the weatherized mineral composition. Other high melting point and digestible fat sources may be used in accordance with the present disclosure and are not limited to those enumerated herein. In some implementations, the fats used in the weatherized minerals may be free or substantially free of non-digestible petrolatum.

As discussed herein, mineral particles may include minerals and nutrients such as mineral mixtures of macronutrients, micronutrients, vitamins, minerals including macrominerals and trace minerals, pelleted minerals and combinations. Macronutrients may include dicalcium phosphate, salt, magnesium oxide and calcium carbonate. In some implementations, magnesium oxide may be provided as a mineral. Loose minerals and nutrients, such as in the form of loose trace minerals, may be included as a portion of the mineral particles. The mineral particles generally may be provided in the form of mineral mixtures including mixtures of various combinations of the enumerated mineral particles. For example, mineral mixtures may include mineral pellets, high salt formulas, salt, dicalcium phosphate, magnesium oxide, calcium carbonate (e.g., limestone) and combinations thereof. The mineral mixtures may also include loose trace minerals, flavor enhancers and colorants such as iron oxide. In some implementations, the mineral particles and mineral mixtures may be free flowing and/or may be free of molasses. In addition, the mineral mixtures may be free or substantially free of soap forming metal oxides such as calcium oxide and magnesium oxide, discussed below.

Mineral pellets within the mineral particles and mineral mixtures may be mixtures of trace minerals and grain or grain components (e.g., wheat, wheat middlings, corn, cracked corn, barley, oats, and grain meals) in crumbled or pelleted form. The mineral pellets may be derived from larger, cylindrical pellets that may be broken apart or crumbled to sizes suitable for free-choice mineral applications. The larger, cylindrical pellets may be formed under high pressure causing the components to bind together without requiring a liquid binder such as molasses. However, some molasses may be provided in the mineral pellets. The mineral pellets may incorporate trace minerals, which may prevent separation of such trace minerals from the mineral mixture. The mineral pellets may be similar in size to the particle sizes of salt, dicalcium phosphate and limestone particles that are used in the mineral mixture (e.g., about 500 microns or about the size of pretzel salt particles). The mineral pellets generally may be free-flowing pellets that may be free of added fats. As a result, the mineral pellets may be easily mixed with the other components of the mineral mixture without additional processing as with some prior art weatherized mineral cores.

In some implementations, loose minerals may be provided in addition to the mineral pellets when the mineral profile of the mineral pellets lacks or includes a lower amount of required nutrients for a livestock animal. For example, beef cattle may require different minerals and nutrients compared to goats and the loose minerals (such as trace minerals, macro minerals or both) may be added to the mineral pellets to supplement the mineral mixture.

In additional implementations, high salt formulas may be used in the mineral mixture without mineral pellets.

In further implementations, the mineral particles and mineral mixtures may be free or substantially free of certain metal oxides (such as calcium oxide and magnesium oxide) or sodium hydroxide that may result in the hydrolysis of the fats (e.g. fatty acid) forming the protective coating. In such implementations, formation of salts of fatty acids (i.e., soap) may be substantially prevented. In alternative implementations, metal oxides such as magnesium oxide may be included in the mineral mixture as a nutrient, but due to the use of high melting point fats such as triglycerides, the high melting point fats generally slowly react with the metal oxide when the fat is in a flowable state, and is non-reactive upon solidifying. In such implementations, formation of salts of fatty acids may be substantially prevented. In addition or alternatively, the mineral particles and mineral mixtures may be free of fatty acids and soaps prior to spray coating, described below. Providing a soap-free finished weatherized mineral product may provide a more digestible coating and may enable the minerals and nutrients to be absorbed and/or digested.

In yet further implementations, the fat-coated mineral particles and mineral mixtures may be coated with an additional liquid coating, such as a mineral oil coating. The liquid outer coating may cause fines such as loose minerals to be incorporated on the outside of the fat-coated mineral particles. This may provide a weatherized mineral product with a reduced amount of fines and a larger percentage of fat coated particles compared to a weatherized mineral product without the additional liquid coating. In this implementation, the fines adhered to the outside of the fat-coated particles may be readily available for absorption prior to the breakdown or digestion of the fat coating. In addition or in combination with mineral oil, the additional liquid coating may be provided with molasses, distillers solubles or other ingestible tacky, non-caking liquids that facilitate binding fines to the outside of the fat-coated mineral particles.

FIG. 1 illustrates a flow diagram of a production system 100 for forming weatherized minerals and nutrients according to some implementations. In FIG. 1, one or more fats, such as palm fat or coconut oil are provided in a vessel 110. The fat, which may be substantially solid at room temperature, may be heated in the vessel 110 to form a flowable oil 115. In some implementations, the vessel 110 may hold the flowable oil 115 at a temperature of about 140° F., at about 160° F., or between about 140° F. to about 160° F. or above.

The flowable oil 115 may be transferred by a pump 120 to a control valve 130 for controlling the flow of the flowable oil 115 to a spray nozzle 140. Upon reaching the spray nozzle 140, the flowable oil 115 may be sprayed into a mixer 150 holding the mineral particles and mixtures described above. As the mixer 150 rotates the sprayed, heated flowable oil 115 forms a coating over the mineral particles and mixtures. Spraying the heated oil into the mixer holding the mineral mixture may provide a more uniformly or evenly coated protective layer over mineral mixture compared to other methods that involve pouring petrolatum in a mixer or the sequential application of a metal oxide followed by pouring petrolatum to produce a soap reaction. The oil coating may harden or dry and provide free-flowing, fat-coated particles. In some implementations, the fat-coated particles may not be tacky, and therefore applying a dusting agent may be unnecessary, while in other implementations, a dusting agent may be applied. In further examples, the flowable oil 115 may be free of soap-forming components such as sodium hydroxide and metal oxides. Accordingly, the protected mineral mixture may be free of or at least substantially free of salts of fatty acids (e.g., soap).

The coated mineral mixture exiting the mixer 150 may be provided as a weatherized mineral mixture. In some implementations, the fat coating forming the weatherized mineral mixture may form about 2 percent of the total weight of the weatherized mineral mixture.

Further processing of the coated mineral mixture may involve applying a liquid coating such as mineral oil to the fat-coated mineral mixture. Referring to FIG. 1, a vessel 160 holding the liquid coating 170 may be transferred via a separate pump 180 and valve 190 to the spray nozzle 140. The liquid coating 170 may be sprayed into the mixer 150 holding the coated mineral mixture. As the mixer 150 rotates, the liquid coating 170 may be applied to the fat-coated mineral mixture as an outer coating. In further implementations, the liquid coating may be heated prior to spray coating to provide a more flowable liquid, such as for higher melting point liquid coatings.

In some implementations, the coated mineral mixture without the outer liquid coating may yield a certain amount of fines including loose trace minerals and macro minerals that are not incorporated into the fat-coated particles of the weatherized mineral mixture in the mixer 150. Surprisingly, it has been found that by spraying the coated mineral mixture in the mixer 150 with the liquid coating 170, particularly mineral oil, the fines are incorporated onto the coated mineral mixture. The liquid coating 170 may thus facilitate binding of the fines to the fat coated mineral mixture, and the liquid coating may further form an outer coating over an inner coating of the fat-coated mineral mixture with the fines of trace minerals and macro minerals arranged between the coating layers. In some implementations, the coated mineral mixture includes an inner coating formed of a of fat that comprises 2 percent by weight of the mineral mixture, and the liquid coating forming the outer coating may be provided in a range between about 0.5 percent to about 2 percent by weight of the mineral mixture. In addition, the liquid coating 170 may enhance shine or may give the coated product a wet look. Generally, the liquid coating 170 does not impede digestion of the digestible fatty acid coating.

In some implementations, the system 100 may maintain the flowable oil 115 in a heated state until the flowable oil 115 exits the spray nozzle 140. For example, once the oil is heated (e.g., heated in the vessel 110, prior to reaching the vessel 110, or both), the heated flowable oil 115 transfers through the system 100 while being maintained at a temperature of at least 140° F., such as by using insulated conduits or by heating the various components of the system 100. Maintaining the system 100 in a heated state may be beneficial for oils that do not flow at room temperature such as the digestible fats provided herein.

In use, the weatherized minerals provided herein, with or without the liquid coating 170, may be offered to livestock animals as free-choice minerals in an open container. It has been found that the weatherized minerals are wind resistant due to the fat coating adding bulk to the mineral particles and mixtures. In addition, the fat coating sheds water dramatically, thereby protecting the minerals from environmental factors such as rain and snow. In some implementations, the additional coating may shed water. In addition, the weatherized minerals exhibit anti-caking properties after being wetted.

When the weatherized minerals are ingested by livestock animals and pass through their digestive tract, any trace or macro minerals atop the fatty acid coating are digested and absorbed, and upon breakdown or digestion of the fat, the underlying minerals and nutrients within the mineral mixture are digested and absorbed, thereby providing vitamins and nutrients to benefit to the livestock animal. In addition, the fat coating over the mineral mixture is digestible and therefore adds an energy source for the livestock animal. In addition, in some implementations, no petroleum by-products are consumed by the animal ingesting the weatherized minerals provided herein. However, even when the additional liquid coating is provided as mineral oil, such weatherized mineral products may provide benefits to the animal due to the fines adhering to the outside of the fat-coated particles via the mineral oil coating, making the fines available for absorption or digestion substantially upon ingestion.

In some implementations, liquid ingredients such as molasses and other organic liquid byproducts typically used as a palatant (e.g., to provide odor and taste) may not be used in the methods of making the weatherized minerals. This may reduce caking of the mineral mixture within the mixer, associated equipment, and may reduce tackiness of the final product. For example, molasses generally increases caking and may be difficult to mix with the mineral particles and mixtures.

The following example provides weatherized mineral mixtures, which are illustrative and not limiting.

Example

Varying levels of mineral oil were provided as the liquid coating over the fat-coated mineral particles and mixtures. Each of the weatherized mineral mixtures tested included 2 percent palm fat (e.g., palm fat with 65 percent palmitic acid) fat coating and 0 percent to 1.5 percent mineral oil outer coating in 0.5 percent increments.

In a twin shaft paddle mixer, the dry ingredients including iron oxide and trace minerals were mixed for one minute. The heated palm fat was pumped to nozzles positioned to spray the palm fat in the mixer. The nozzles were steam purged while the mixer mixed the fat-coated particles for between about 30-45 seconds. Using the nozzles, mineral oil was sprayed into the mixer containing the fat-coated particles and mixed for one minute.

Surprisingly, there was a significant improvement in appearance as the level of mineral oil increased. The most dramatic improvements were between 0 percent and 0.5 percent and surprisingly between 1.0 percent and 1.5 percent. The 0 percent mineral oil weatherized mineral product looked dry and dusty. As the level of mineral oil increased to 0.5 percent and above, the apparent fines level decreased.

At 1.5 percent mineral oil, the appearance of fines essentially disappeared, which was unexpected. Providing a liquid coating such as mineral oil after applying the fat coating to the mineral mixture results in incorporation of the fines, which may provide a more desirable product as the incorporated fines on the outside of the fat-coated particles may be prevented from otherwise being carried away by wind.

Although the present disclosure provides references to preferred embodiments, persons skilled in the art will recognize that changes may be made in form and detail without departing from the spirit and scope of the invention.

What is claimed is:

1. A method of forming a weather-resistant, anti-caking mineral mixture for livestock, comprising:
    heating a digestible fat to form a flowable, digestible fat; and
    spraying a mineral mixture with the flowable, digestible fat to provide a protective layer over the mineral mixture adhering loose trace minerals or fines to the protective layer by spraying a mineral oil coating to form the a weather-resistant, anti-caking mineral mixture;
    said weather-resistant, anti-caking mineral mixture being free of salts of fatty acids.

2. The method of claim 1, the fat comprising palm stearin.

3. The method of claim 1, the mineral mixture comprising one or more of macronutrients, micronutrients, minerals, trace minerals and pelleted minerals.

4. The method of claim 1, the step of spraying further comprising spraying the mineral mixture with the flowable fat in a mixer.

5. The method of claim 1, the mineral mixture comprising pelleted minerals.

6. The method of claim 5, the pelleted minerals free of a binder.

7. The method of claim 5, the pelleted minerals free of added fats prior to the step of spraying.

8. A method of forming a weather-resistant, anti-caking mineral mixture for livestock, comprising:
    heating a digestible fat to form a flowable digestible fat;
    spraying the flowable digestible fat over at least a first portion of a mineral mixture to form a protective layer over the first portion;
    providing a second portion of the mineral mixture, the second portion substantially free of the protective layer; and
    spraying an oil over the first and second mineral mixture portions to incorporate the second portion onto the protective layer overlying the first portion to provide a weather-resistant, anti-caking mineral mixture,
    said weather-resistant, anti-caking mineral mixture being free of salts of fatty acids.

9. The method of claim 8, further comprising rotating the at least first portion of the mineral mixture in a vessel during the step of spraying the flowable digestible fat.

10. The method of claim 8, further comprising rotating the first and second portions of the mineral mixture portions in a vessel during the step of spraying the oil.

11. The method of claim 8, wherein heating the digestible fat to form the flowable digestible fat comprises heating to at least 140° F.

12. The method of claim 8, the first portion of the mineral mixture comprising pelleted minerals and the second portion comprising trace minerals.

13. A product made by the method of claim 1.

14. A product made by the method of claim 8.

* * * * *